(12) United States Patent
Parker et al.

(10) Patent No.: US 10,908,346 B1
(45) Date of Patent: Feb. 2, 2021

(54) WAVEGUIDE LIGHTING FIXTURE PROVIDING AMBIENT LIGHT

(71) Applicant: LUMINII LLC, Niles, IL (US)

(72) Inventors: Jeffery Parker, Northfield, IL (US); Meng Yang, Buffalo Grove, IL (US)

(73) Assignee: LUMINII LLC, Niles, IL (US)

( * ) Notice: Subject to any disclaimer, the term of this patent is extended or adjusted under 35 U.S.C. 154(b) by 0 days.

(21) Appl. No.: 16/541,238

(22) Filed: Aug. 15, 2019

(51) Int. Cl.
F21V 8/00 (2006.01)
F21V 7/00 (2006.01)
F21Y 115/10 (2016.01)

(52) U.S. Cl.
CPC .......... G02B 6/0055 (2013.01); F21V 7/0016 (2013.01); G02B 6/0018 (2013.01); G02B 6/0078 (2013.01); F21Y 2115/10 (2016.08)

(58) Field of Classification Search
None
See application file for complete search history.

(56) References Cited

U.S. PATENT DOCUMENTS

| | | | | |
|---|---|---|---|---|
| 9,625,636 B2* | 4/2017 | Durkee | ............... | G02B 6/0046 |
| 9,645,303 B2* | 5/2017 | Tarsa | ........................ | F21S 8/00 |
| 10,436,970 B2* | 10/2019 | Durkee | ............... | G02B 6/0063 |
| 2014/0078772 A1* | 3/2014 | Gaydoul | .................. | G02B 5/04 362/555 |
| 2015/0049511 A1* | 2/2015 | Tarsa | .................. | G02B 6/0073 362/612 |
| 2015/0316703 A1 | 11/2015 | De Sugny et al. | | |

* cited by examiner

Primary Examiner — Vip Patel
(74) Attorney, Agent, or Firm — Saul Ewing Arnstein & Lehr LLP

(57) ABSTRACT

A light fixture for waveguided ambient light is described herein. In one embodiment, the light fixture includes an LED light source for emitting light rays, a waveguide optically coupled to the LED light source to receive and guide the emitted light rays from a proximal end of the waveguide to a distal end of the waveguide, a first indirect lighting surface configured to receive a first portion of the emitted light rays and reflect the first portion at a first distribution to produce a first ambient light source, and a second indirect lighting surface configured to receive a second portion of the emitted light rays and reflect the second portion at a second distribution to produce a second ambient light source.

13 Claims, 13 Drawing Sheets rectangle shape

L shape square shape configuration A configuration B

WAVEGUIDE LIGHTING FIXTURE PROVIDING AMBIENT LIGHT

BACKGROUND OF THE INVENTION

Generating ambient light through the use of waveguides has been problematic in the lighting industry. Since waveguides typically include a small diameter output, the resulting waveguided light includes a high intensity beam. Generating ambient light from a high intensity, small diameter output is difficult to achieve. Furthermore, compounding these issues is that the nature of residential and commercial settings requires the light fixture generating the ambient light to provide for an aesthetically pleasing light fixture while simultaneously preventing a user from focusing on the light fixture itself.

SUMMARY

A waveguided light fixture providing directional and ambient light is described herein. The light fixture may include an LED light source for emitting light. The emitted light from the LED light source may be received from a waveguide of the light fixture. The wave guide may guide the emitted light through the body of the waveguide to a distal end of the waveguide. The guided light can then be transmitted from the distal end of the waveguide to a first and second indirect light surfaces, or from one or more of the sides based on patterns on the sides. The indirect lighting surfaces receive the transmitted light and reflect the transmitted light at predetermined angles, such that the transmitted light is dispersed. This dispersal both reduces the intensity of the transmitted light from the waveguide as well as increase the beam width of the light, resulting in projected ambient light from the waveguided light fixture.

A light fixture for waveguided ambient light is described herein. In one embodiment, the light fixture includes an LED light source for emitting light rays, a waveguide optically coupled to the LED light source to receive and guide the emitted light rays from a proximal end of the waveguide to a distal end of the waveguide, a first indirect lighting surface configured to receive a first portion of the emitted light rays and reflect the first portion at a first distribution to produce a first ambient light source, and a second indirect lighting surface configured to receive a second portion of the emitted light rays and reflect the second portion at a second distribution to produce a second ambient light source.

This aspect of the invention can have a variety of embodiments. In one embodiment, the light fixture includes a microlens located on or in at least one surface of the distal end of the waveguide and configured to receive the emitted light rays and transmit the emitted light rays. In one embodiment, the light fixtures can include a prismatic or lenticular surface located on or in at least one surface of the distal end of the waveguide and configured to receive the emitted light rays and transmit the emitted light rays.

In some cases, the first distribution includes an approximately 20 degree angle from a direction of emission for the emitted light rays. In some cases, the emitted light rays form a batwing profile. In some cases, the batwing profile comprises a square batwing profile. In some cases, the waveguide includes a translucent material. In some cases, the guided light rays are imperceptible within the waveguide and perceptible upon reaching the distal end of the waveguide.

In another embodiment, the light fixture includes at least one LED light source adapted or configured to produce light, at least one waveguide adapted or configured to: receive, at an edge of the waveguide, the produced light, and guide the light through the waveguide, and a structure adapted or configured to redirect a portion of the guided light to produce a predetermined light distribution.

This aspect of the invention can include a variety of embodiments. In one embodiment, the at least one waveguide includes a first waveguide and a second waveguide, where the first waveguide and the second waveguide are positioned so as to define a gap between them. In some cases, the first waveguide and the second waveguide are configured such that they are opposite to each other. In some cases, the at least one waveguide guides light to an interior of the fixture. In some cases, the at least one waveguide is further adapted or configured to define a hole, slot or cavity.

In one embodiment, the light fixture further includes a first waveguide and a second waveguide, a support structure, where the first waveguide and the second waveguide are mounted to the support structure and on a same plane, at least one LED light attached to an exterior of either the first waveguide or the second waveguide, the at least one LED adapted or configured to direct light from the attached waveguide and direct the light towards the other waveguide.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Figure 1:
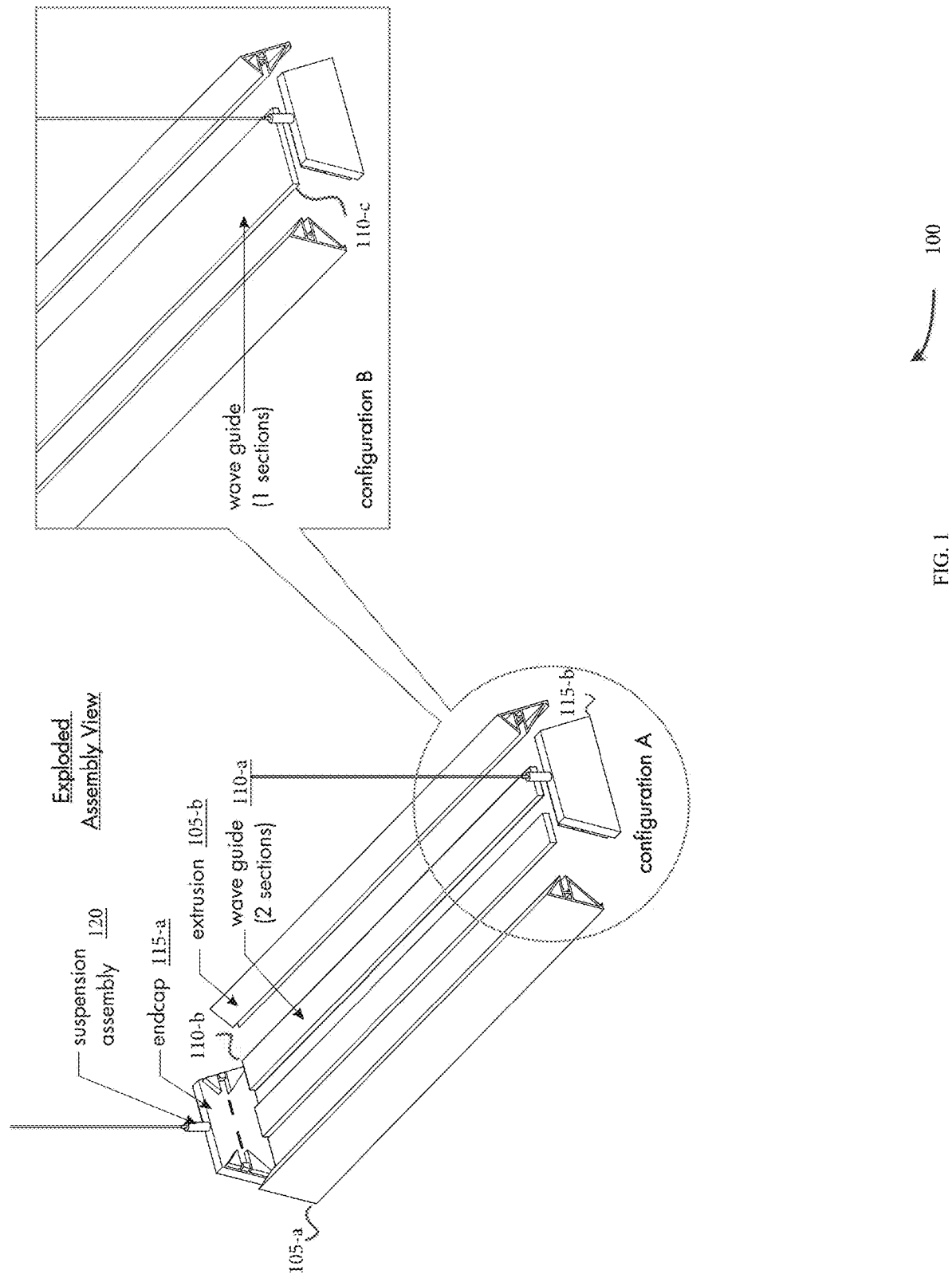
FIG. 1 depicts a waveguide lighting fixture providing ambient light, according to an embodiment of the claimed invention.

FIG. 1 depicts a waveguide light fixture 100, according to an embodiment of the claimed invention. The light fixture 100 can include a first extrusion 105-a. The first extrusion 105-a can be configured to include a cavity. For example, the first extrusion 105-a can be composed of a series of support structures, such that the support structures create an opening that forms the cavity.

The cavity can be configured to receive a waveguide 110-a. The waveguide 110-a can be partially located within the cavity of the first extrusion 105-a, such that the waveguide 110-a partially protrudes the body of the first extrusion 105-a. For example, a proximal end of the waveguide 110-a can be located within the cavity of the first extrusion 105-a, whereas a distal end of the waveguide 110-a can be located externally from the first extrusion 105-a. Additionally, the first extrusion 105-a can provide support for the waveguide 110-a (e.g., via the support structures) to maintain the positioning of the waveguide 110-a.

The light fixture 100 can be composed of a rigid material such as a metal or metal alloy (examples of which include aluminum, cadmium, niobium, copper, gold, iron, nickel, platinum, silver, tantalum, titanium, zinc, zirconium, aluminum, cold rolled steel, stainless steel, brass, and the like), plastics (examples of which include acrylics, polycarbonates, polyethylene, urea formaldehyde, acrylonitrile butadiene styrene, alkyd resins, amino resins, epoxy resins, ethylene vinyl acetate, phenol formaldehyde, polyacetal, polyamide, polyesters, polyethylene, polymethyl methacrylate, polymethyl pentane, polyphenylene oxide, polyphenylene sulphide, polystyrene, polysulphone, polytetrafluoroethene, polyvinyl chloride, styrene acrylonitrile, and the like), or a combination thereof.

The light fixture 100 can either be configured to include just one waveguide or be configured to include multiple waveguides. In the one waveguide configuration, a second extrusion can attach to the distal end of the waveguide 110-c in a manner similar to that of the first extrusion 105-a and the proximal end of the waveguide 110-a. For example, another extrusion can be configured to include a cavity, where the distal end of the waveguide 110-c can be located within the cavity of the other extrusion. The other extrusion can provide additional support for the waveguide 110-c (e.g., via support structures) to maintain the positioning of the waveguide 110-c.

Alternatively, the light fixture 100 can include multiple waveguides. For example, as shown in FIG. 1, configuration A includes two waveguides. The second extrusion 105-b can thus be configured to attach to a second waveguide 110-b. The second waveguide 110-b can attach to the second extrusion 105-b via a proximal end. A distal end of the second waveguide 110-b can then be located external to the cavity of the second extrusion 105-b. While the configuration A illustrates two waveguides, the fixture 100 can also be configured to include any number of waveguides, such as three, four, five, etc. Additionally, the number of extrusions can also vary as well. In some cases, the number of extrusions can be equal to the number of waveguides in the light fixture 100 (e.g., in order to provide support for each waveguide of the light fixture 100).

Each waveguide of the light fixture 100 can be optically coupled to a light source. For example, in configuration A, the first waveguide 110-a can be optically coupled to a first light source (e.g., such as light source 215 shown in FIG. 2), and the second waveguide 110-b can be optically coupled to a second light source. The first source can be located within the cavity of the first extrusion 105-a, and the second light source can be located in the cavity of the second extrusion 105-b. Each light source can emit light waves, which can then be received by their respective waveguide (e.g., light waves from the first light source are received by the first waveguide 110-a, etc.).

Alternatively, in configuration B, the single waveguide 110-c can be optically coupled to a light source. The light source can emit light waves, and can be located within the cavity of one of the extrusions to which the waveguide is attached to (e.g., the first extrusion 105-a, the second extrusion 105-b, etc.). The emitted light waves can subsequently be received by the waveguide 110-c. In some cases, configuration B can include multiple light sources for the waveguide 110-c. For example, both the first extrusion and the second extrusion can include a light source for the waveguide 110-c.

Various types of light sources can be used in the light fixture 100. For example, an exemplary embodiment provides for LED lighting, laser lighting, and/or fiber optic lighting as the light sources for the ambient/directional/uplighting lighting sources. However, the light fixture 100 can also include incandescent light, compact fluorescent (CFL) light, halogen light, metal halide light, high pressure sodium (HPS) light, low pressure sodium (LPS) light, phosphor-converted amber (PCA) light, narrow-band amber (NBA) light, or a combination thereof.

Although not shown in FIG. 1, light fixture 100 can also include wiring to couple the various light sources to a power source. In some cases, one of more of the light sources can be wired together in series or in parallel to receive power, such as a connections to a main power source. In some cases, the various light sources can be wired independently from one another, thereby allowing for each light source to be independently operable (e.g., can be turned on or off individually). In some cases, the light fixture 100 can be connected to a battery source in lieu of, or in addition to, a main power source. Additionally or alternatively, the light fixture 100 can include a short-range wireless communication system (e.g., a wireless local area network (WLAN) receiver), that allows for the light sources to be operated wirelessly.

The light fixture 100 can also include end caps 115-a and 115-b. The end caps can further support the positioning of the waveguides in the light fixture 100. In some cases, an end cap can attach to ends of extrusions of the light fixture 100. For example, the end caps in configuration A and/or configuration B can attach to an end of the first extrusion and an end of the second extrusion. This can provide for additional structural integrity for the light fixture 100. Additionally or alternatively, the end caps can attach to a lateral end of a waveguide to maintain the positioning of the waveguide in the light fixture. For example, a first end cap 115-a in configuration A can include a cavity for positioning a first lateral end of the waveguide into, and a second end cap 115-b can include a cavity for positioning a second lateral end of the waveguide into. In some cases, the end caps can hold sensors, switches and provide means for power input. The end caps can be configured in various shapes. For example, an end cap can be configured in a rectangular shape, a trapezoidal shape, a circular shape, etc. Further, the end caps can also include attached mounting mechanisms (e.g., suspension assembly 120) for connecting the light fixture 100 to an additional surface, such as a wall or ceiling.

The system can also implement dynamic lighting. Dynamic light can include, as examples, light dimming, changing colors of the light, multiple tracks with different channel, a reallocation of power between different light sources, an adjustment of light color a light source, or a combination thereof.

Physical properties of the waveguide allow for received light to be carried (e.g., guided) through the body of the waveguide with minimal light attenuation, dissipation, scattering, etc. This guided light can be received by a covering couple to, or deformities attached or formed on a surface of end of the waveguide, and subsequently projected from the waveguide.

Various coverings can be attached to the waveguide surfaces that can affect the ambient light projected from the waveguide. For example, a prism, lens, microlens, and the like, can be attached or formed on (e.g., via laser etching in real time or molded on) to a surface or end of the waveguide. The prism or lens can affect the beam direction, intensity, and other various characteristics of the projected light. In another example, a light shield or reflector can be attached to a surface of the waveguide. The light shield or reflector can block any ambient light from being projected from that particular surface of the waveguide. For example, the surface facing towards a ceiling can be fitted with a light shield or reflector so that ambient light is projected towards a floor.

Further, in configuration A, the distal end of a waveguide can be fitted with a prism, lens, or diffuser. Light that passes through the body of the waveguide can be received by the fitted prism or lens, or diffuser and can project the guided light in a predefined manner. For example, various light projection properties, such as light intensity, beam scattering, beam half-width, and transmission angle, can be manipulated based on a selected optical prism or lens.

Figure 4:
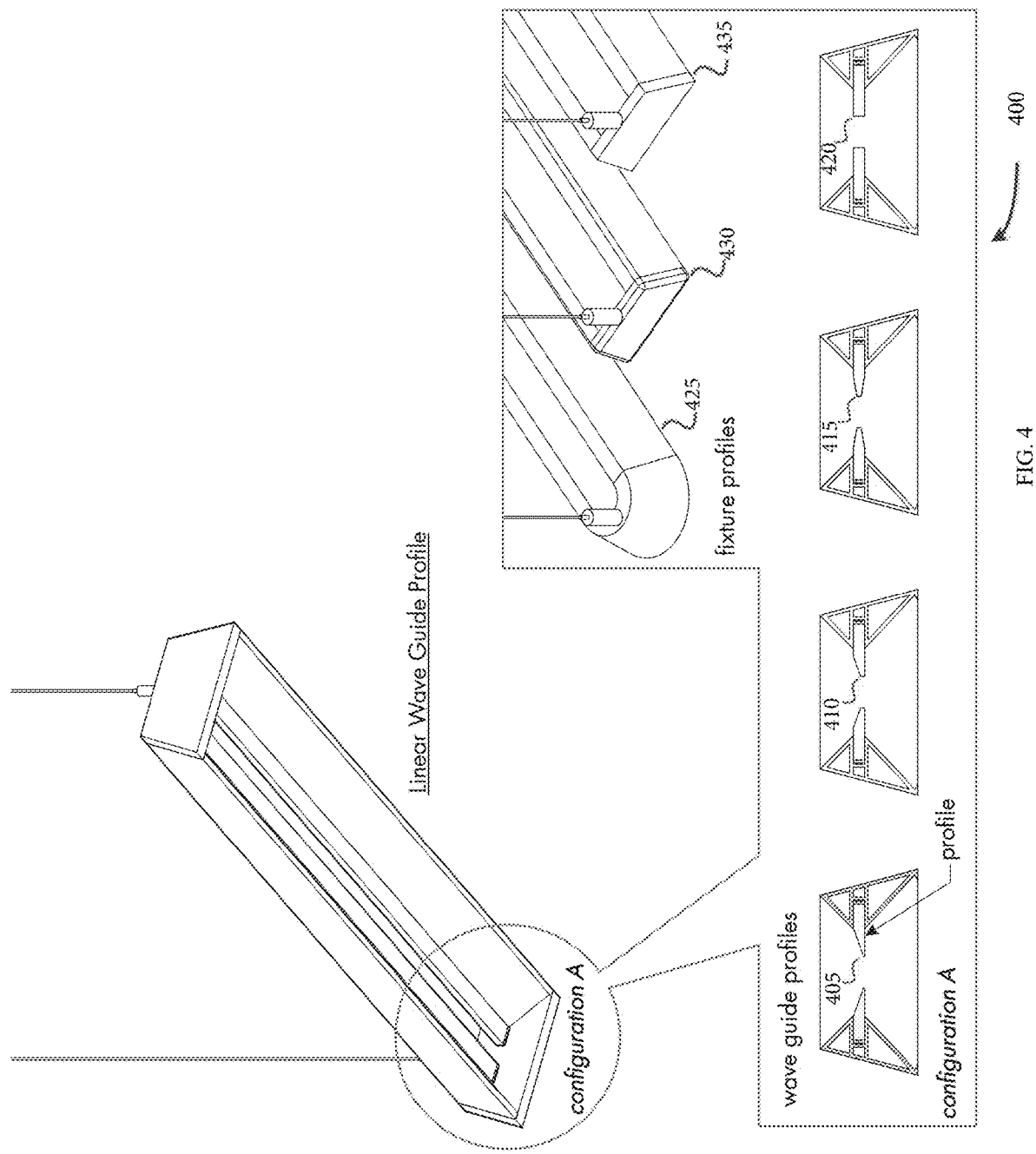
FIG. 4 depicts side profiles of waveguide lighting fixtures, according to an embodiment of the claimed invention.

The shape of the distal end of the waveguide can also impact the projected light characteristics. For example, FIG. 4 depicts various shapes for the distal end of waveguides implemented in configuration A (e.g., waveguides 110-a and 110-b of FIG. 1) The distal end shape can in some cases vary based on the angle of convergence between the surface planes of the waveguide. For example, the side profile 405 illustrates a steep convergence angle of one surface plane and no convergence angle for another surface plane. In another example, the side profile 410 illustrates a gradual convergence angle of one surface plane and no convergence angle for another surface plane. In another example, the side profile 415 illustrates a gradual convergence angle of one surface plane and a gradual convergence angle for another surface plane. In yet another example, the side profile 420 illustrates no convergence angle for any surface plane. The shape of the distal end for the waveguide can affect both the ambient light (e.g., light intensity, beam scattering, beam half-width, transmission angle, etc.) projected from the waveguide surfaces, as well as ambient light projected from the distal end of the waveguide (e.g., through a prism or lens coupled to the distal end).

The shape of the end caps can also affect the light projection (e.g., through differing reflective properties). For example, FIG. 4 also depicts a rounded end cap 425, a reflective end cap 430, and a trapezoidal end cap 435. The materials (e.g., reflective, absorbent, etc.) and shapes (curved vs. flat surfaces, etc.) used for these end caps can affect the light projected from the fixture.

Figure 5:
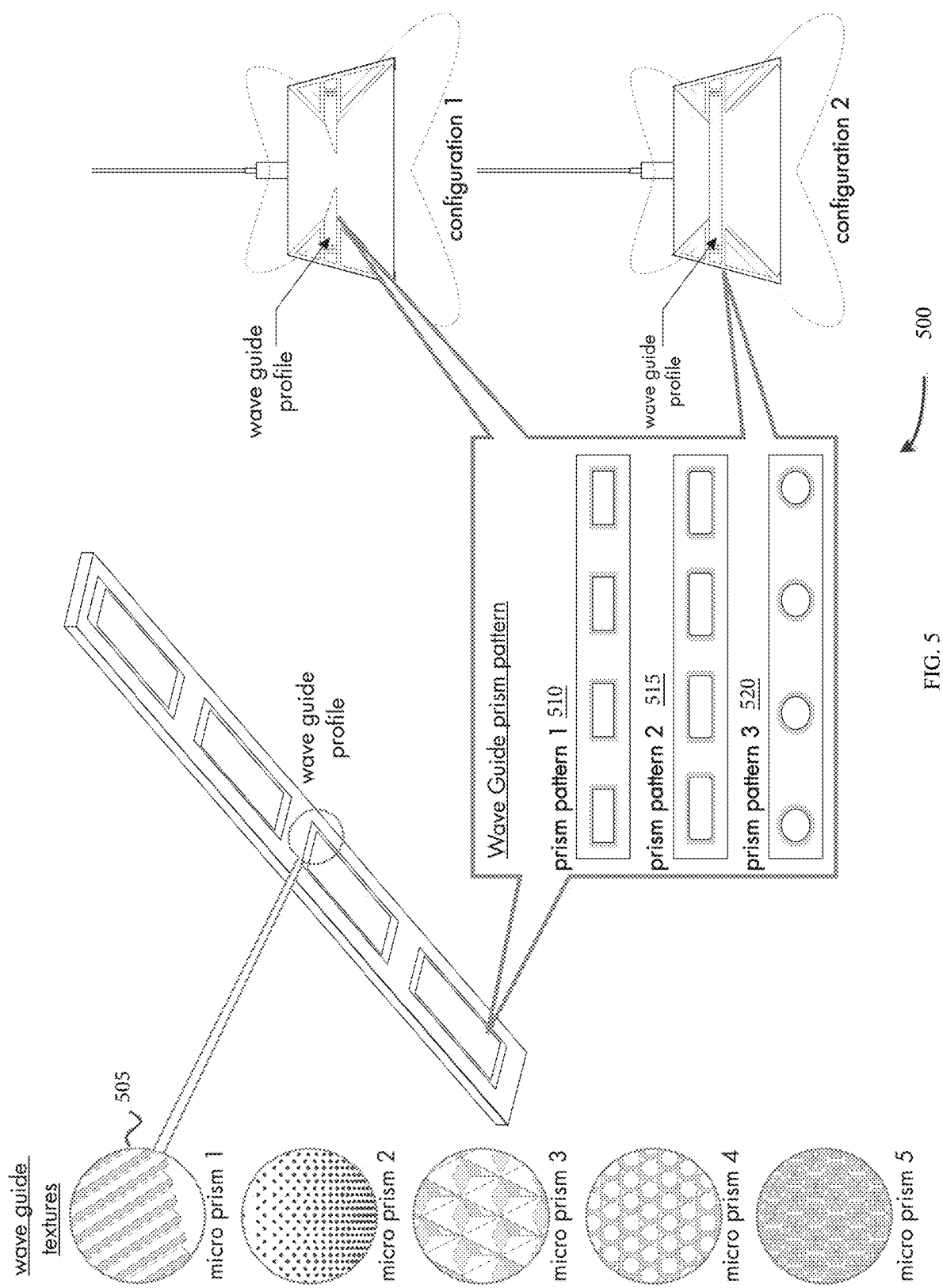
FIG. 5 depicts prism, a microlens, laser etched material, or other textures that cause light to emitted and for waveguide lighting fixtures, according to an embodiment of the claimed invention.

The projected light from the waveguide surface can also be affected by a pattern of the attached lens or prism. For example, FIG. 5 depicts prism patterns 510, 515, and 520 for a light fixture (e.g., light fixture 100 of FIG. 1). For example, prism pattern 510 includes a rectangular shape, prism pattern 515 includes a rectangular shape with rounded corners, and prism pattern 520 includes a circular shape. Based on the pattern of the prism or lens used, the projected light characteristics from the light fixture can be affected. Examples of assemblies utilizing these prism patterns are discussed in more detail with reference to FIGS. 8-10.

The projected light from the waveguide surfaces can also be affected by a surface texture of the attached or formed lens, microlens, prism, laser-etched material, deformities, or the like. For example, FIG. 5 also illustrates various types of prism patterns for use with a light fixture, such as fixture 100 of FIG. 1. The prism pattern configuration can also affect the angles of transmission and light intensity for the projected light. For example, the micro prism texture 505 depicts parallel grooves along the prism. As such, the projected light intensity and/or angle of transmission will be affected based on whether the light is projected from a prism groove or alternatively from a prism peak.

Figure 6A:
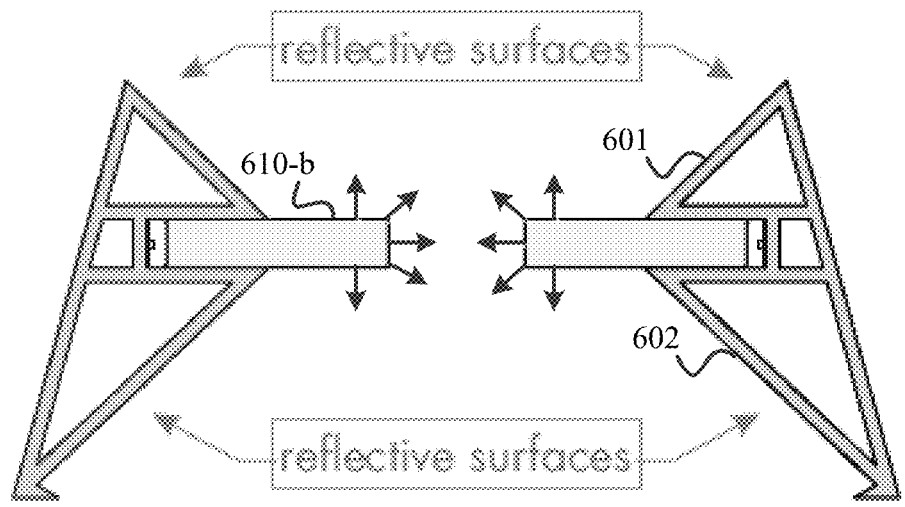
FIGS. 6A and 6B depict reflective surfaces for waveguide lighting fixtures, according to an embodiment of the claimed invention.
Figure 6A:
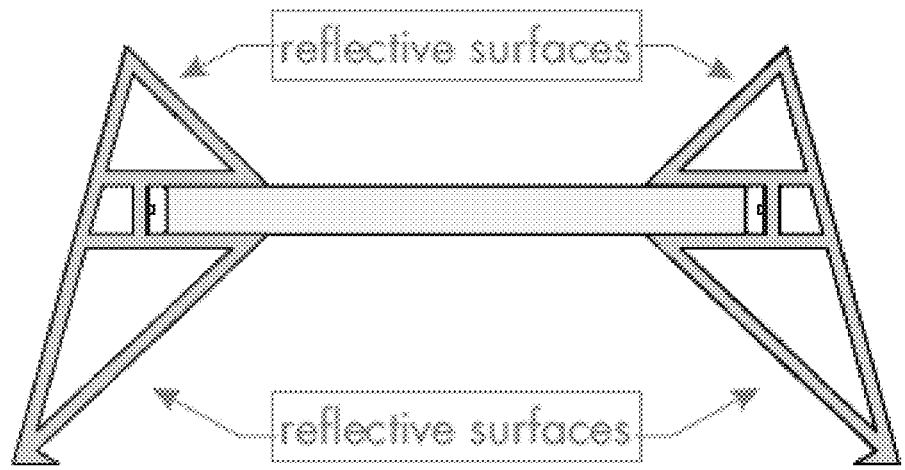
Figure 6B:
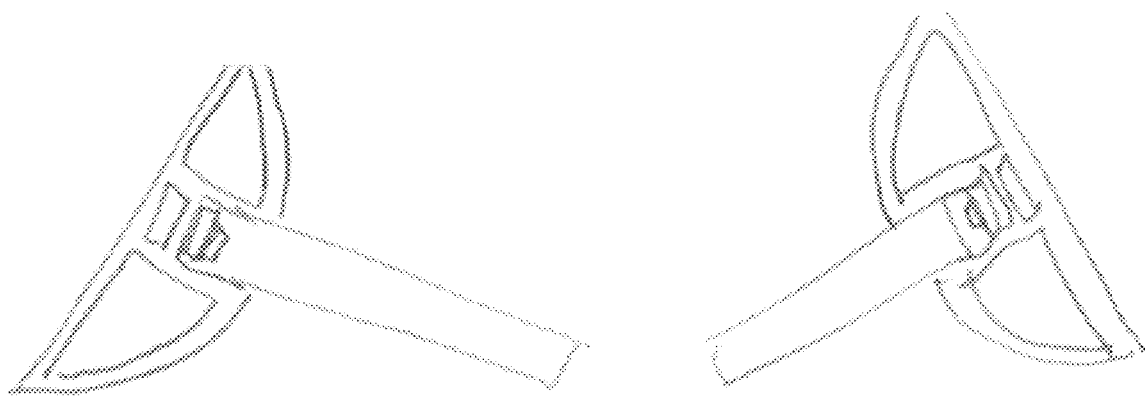

Extrusions of the light fixture can include reflective surfaces. FIG. 6 illustrates these reflective surfaces. Each extrusion can include an overhead reflective surface (e.g., overhead reflective surface 601) and/or an underhead reflective surface (e.g., underhead reflective surface 602). The overhead reflective surface can be formed by the support structure of the extrusion, and can be configured to be positioned above the waveguide (e.g., waveguide 610-a), which can be an example of a waveguide 110-a, 110-b, or 110-c with reference to FIG. 1. Similarly, the underhead reflective surface can be formed by the support structure of the extrusion, and can be configured to be positioned below the waveguide.

The overhead reflective surface and the underhead reflective surface can receive projected light from the waveguide (e.g., projected from a coupled prism, lens, or an end of the waveguide). The reflective surfaces can then reflect the projected light at an angle (e.g., an angle of 10, 15, 20, 25, 30, 35, 40, 45, 50, 55, 60, 65, 70, 75, 80 degrees, etc.) based on the reflective type and/or surface angle relative to the positioning of the waveguide. The surface angle of the reflective surfaces can thus affect the light intensity, beam scattering, beam half-width, transmission angle, etc.

Figure 7:
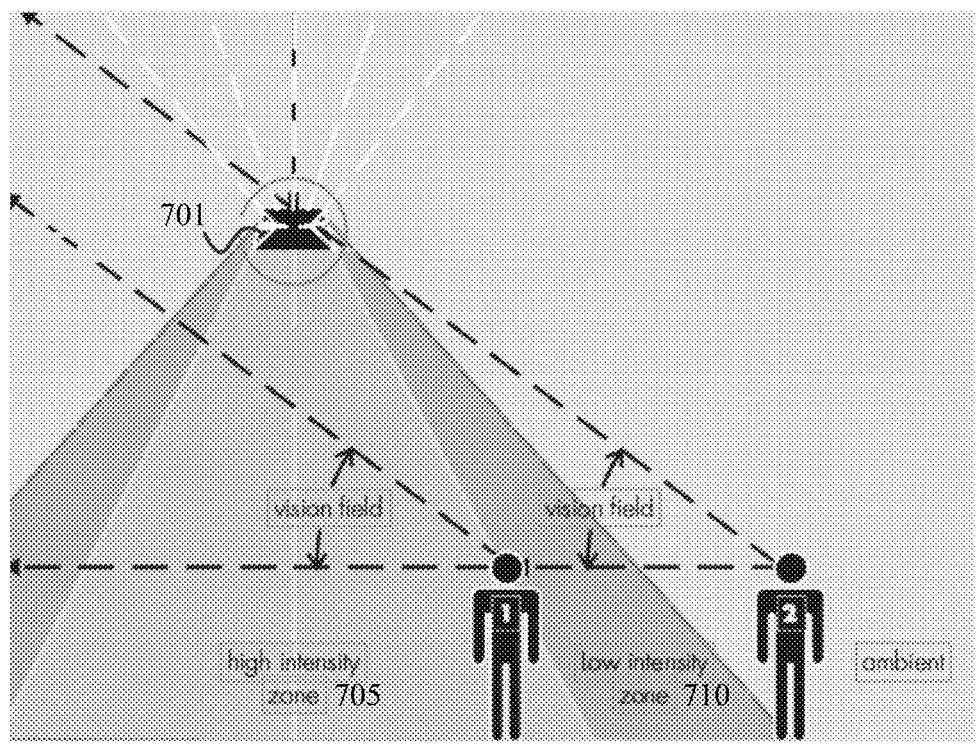
FIG. 7 depicts projection zones for waveguide lighting fixtures, according to an embodiment of the claimed invention.

FIG. 7 depicts light patterns from a light fixture 701, which can be an example of a light fixture 100 of FIG. 1. The light fixture will include two light pattern zones: a high intensity zone 705 and a low intensity zone 710. The high intensity zone 705 can include a higher projected light intensity compared to the low intensity zone 710, which can be based on the configuration used, the prisms or lenses attached, the shape of the waveguide, etc.

In some cases, when a user (either user 1 or user 2) looks at the fixture from below, the user will view the illuminated coupled lens or prism(s) connected to the waveguide(s). Further, a user will be able to view the reflective surfaces which can be illuminated by the reflected ambient light. In some cases, the waveguide can be transparent or translucent. Since the waveguide itself can have minimal light projected from the waveguide, a user may be able to see through the waveguide portions of the light fixture 105. Further, as the light fixture 701 creates ambient light through the decrease of light intensity (e.g., reflection, scattering, etc.), a user can view the light fixture 701 with minimal glare or harsh lighting projected from the fixture 701, regardless of the original intensity of the light transmitted from the light source(s). In one embodiment, user 2 can see only the reflected light from the system.

Figure 2:
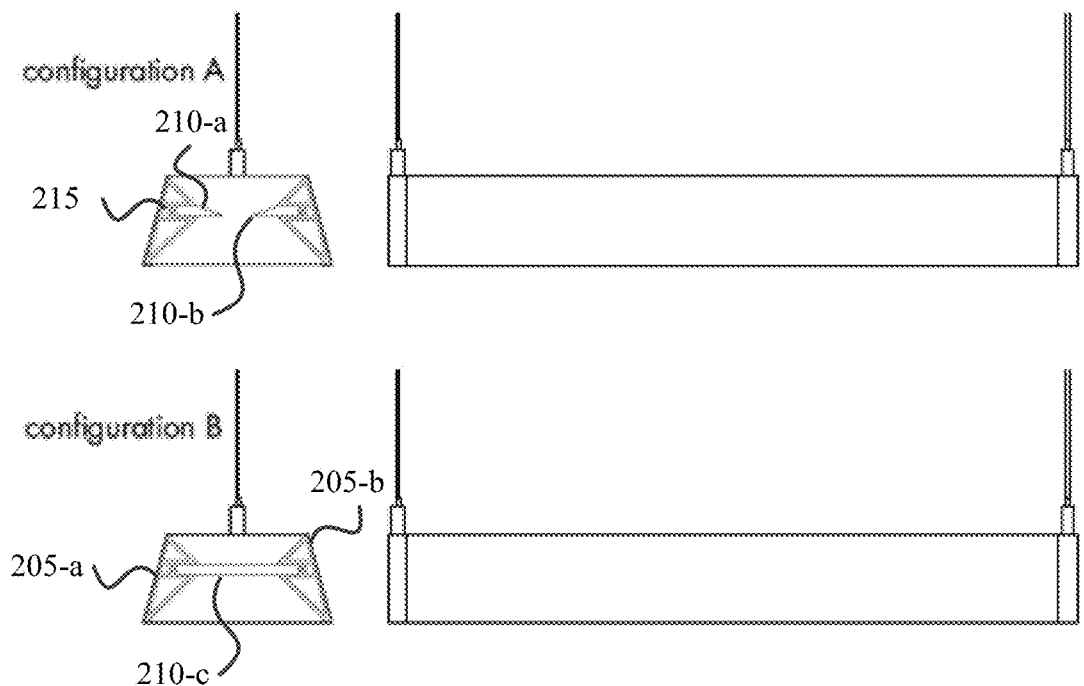
FIG. 2 depicts side profiles of waveguide lighting fixtures, according to an embodiment of the claimed invention.

FIG. 2 illustrates side profiles for configurations A and B of the light fixture. As shown, the waveguides 210-a and 210-b in configuration A include a gap between the distal ends of the waveguides, whereas the waveguide 210-c in configuration B connects to both extrusions 205-a and 205-b.

Figure 3:
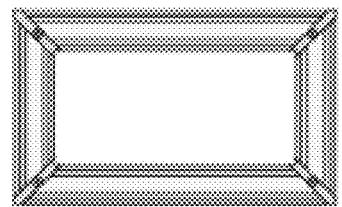
FIG. 3 depicts waveguide lighting fixture arrays, according to an embodiment of the claimed invention.
Figure 3:
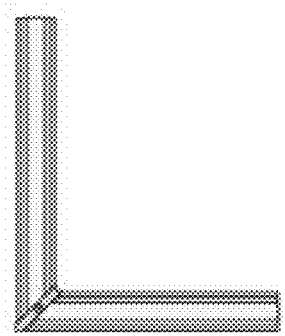
Figure 3:
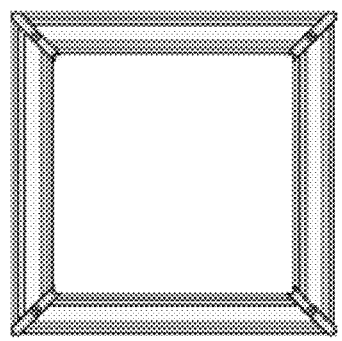

Multiple light fixtures can be connected to each other to form various shapes. For example, FIG. 3 depicts various assemblies for multiple light fixtures. A combination of light fixtures can be used to form a rectangular shape (e.g., using two different lengths of light fixtures), an L-shape, or a square shape (e.g., using 4 light fixtures of the same length). However, these are only examples, and various other shapes may be made by connecting multiple light fixtures together.

Figure 8:
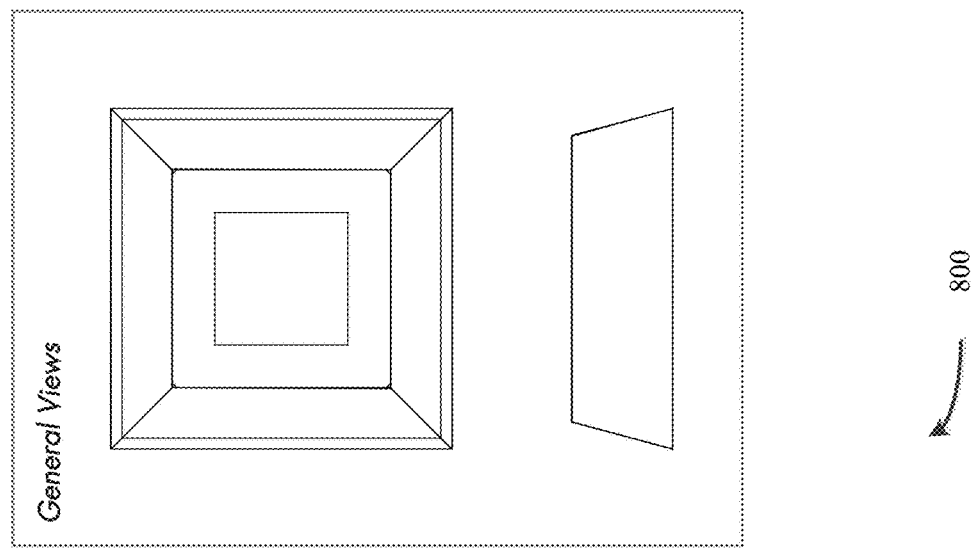
FIGS. 8 and 9 depicts assemblies for waveguide lighting fixtures, according to embodiments of the claimed invention.
Figure 8:
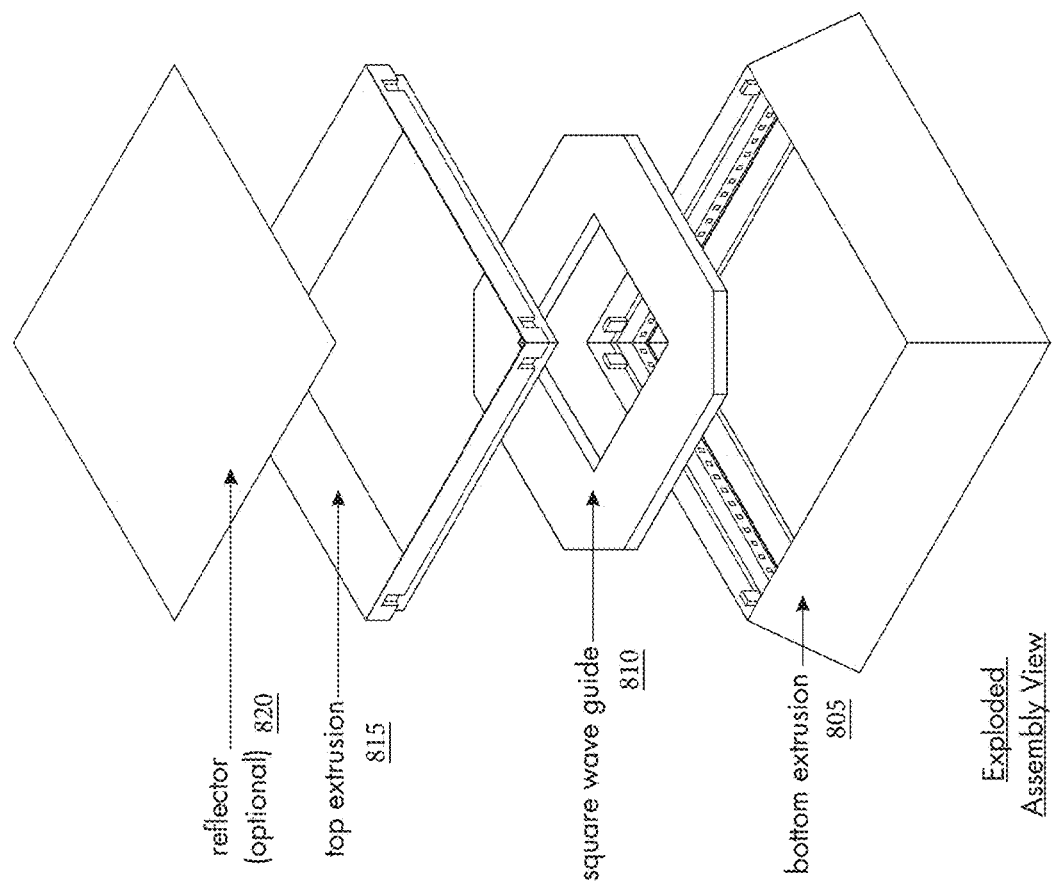
Figure 9:
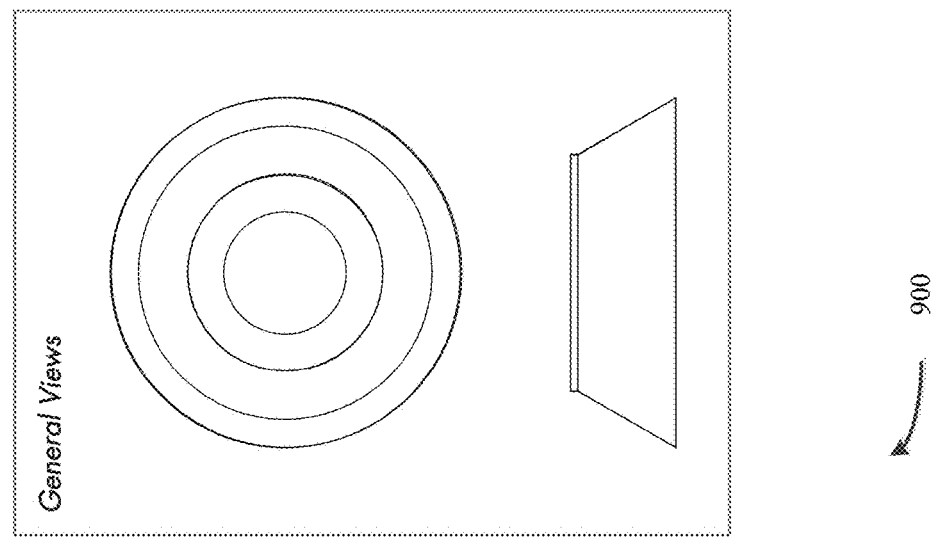
Figure 9:
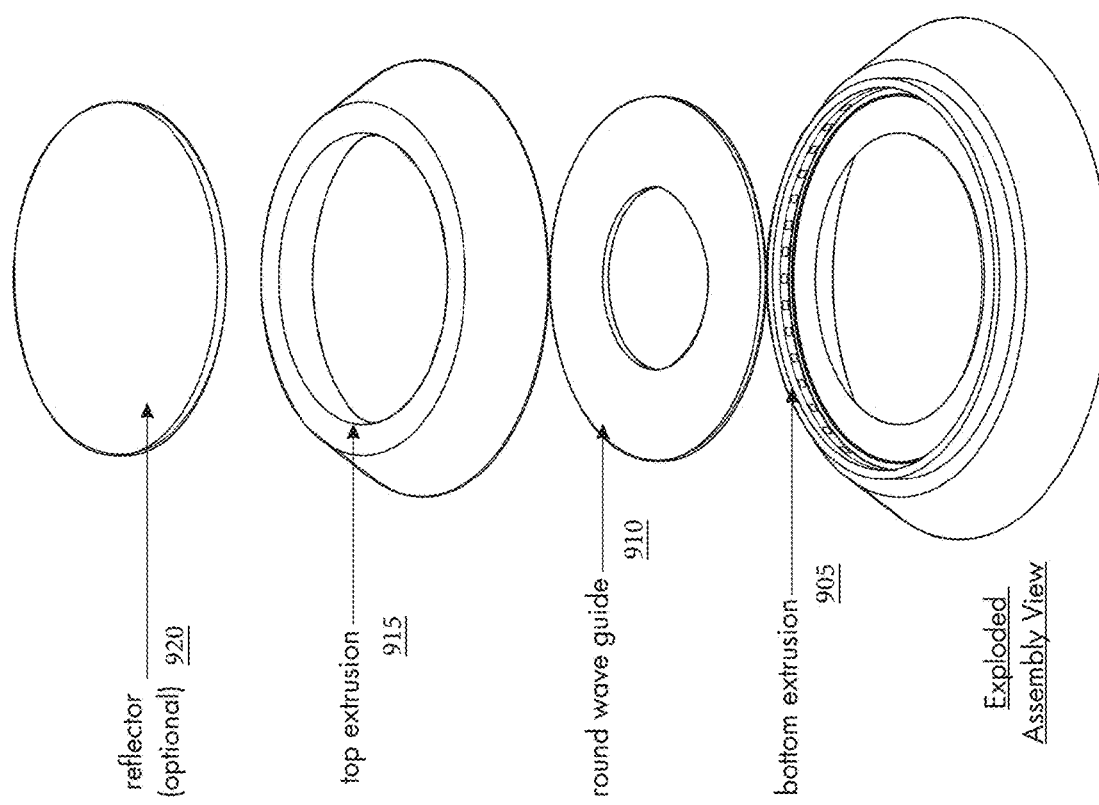

FIGS. 8 and 9 illustrate light fixture assemblies 800 and 900 for embodiments of the light fixture, such as fixture 100 of FIG. 1. Light assembly 800 can be for a square-shaped light fixture. The light assembly 800 can include a bottom extrusion 805, which can be an example of an extrusion 105-a, 105-b of FIG. 1. The light assembly 800 can also include a top extrusion 815, which can be an example of an extrusion 105-a, 105-b of FIG. 1. The light assembly 800 can also include a waveguide 810, which can be an example of a waveguide 110-a, 110-b, 110-c of FIG. 1. Optionally the light assembly 800 can also include a reflector 820, which can prevent light projection from the top of the light assembly 800.

Light assembly 900 can be for a round-shaped light fixture. The light assembly 900 can include a bottom extrusion 905, which can be an example of an extrusion 105-a, 105-b of FIG. 1. The light assembly 900 can also include a top extrusion 915, which can be an example of an extrusion 105-a, 105-b of FIG. 1. The light assembly 900 can also include a waveguide 910, which can be an example of a waveguide 110-a, 110-b, 110-c of FIG. 1. Optionally the light assembly 900 can also include a reflector 920, which can prevent light projection from the top of the light assembly 900.

Figure 10:
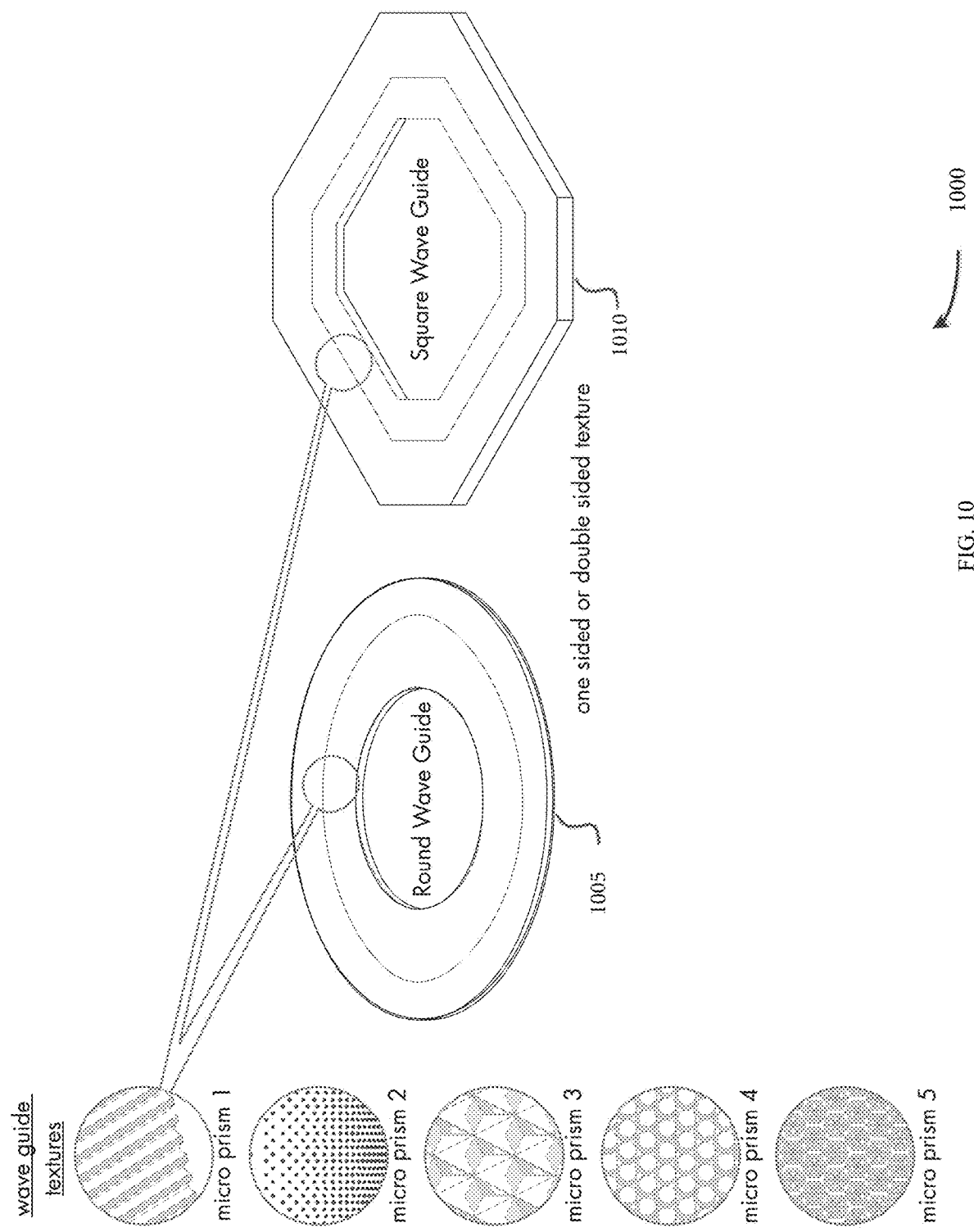
FIG. 10 depicts waveguides of waveguide lighting fixtures, according to embodiments of the claimed invention.

FIG. 10 illustrates waveguides for a light fixture, such as light fixture 100 of FIG. 1. Waveguide 1005 can be a round waveguide, and can include a round prism or lens. Light can be carried through the body of the waveguide and be projected from the prism or lens. The combination of the round waveguide and lens can provide a round prism pattern, such as prism pattern 520 of FIG. 5.

Waveguide 1010 can be a square waveguide, and can include a square prism or lens. Light can be carried through the body of the waveguide and be projected from the prism or lens. The combination of the square waveguide and lens can provide a square prism pattern, similar to prism patterns 510 or 515 of FIG. 5.

Figure 11:
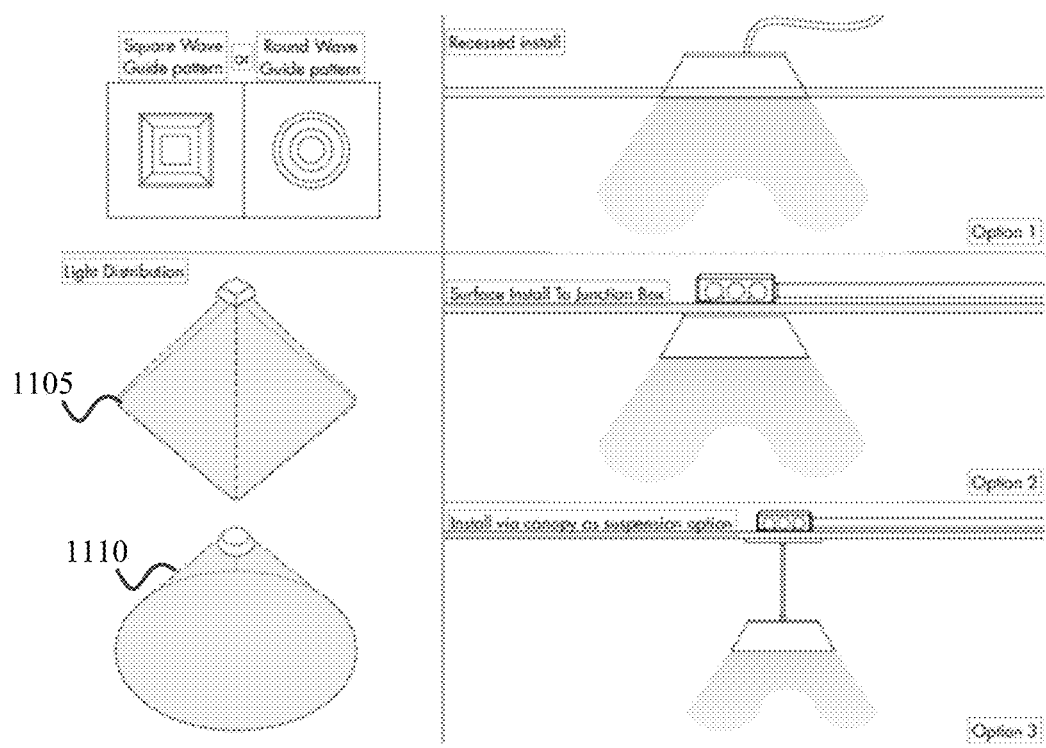
FIG. 11 depicts light distribution patterns for waveguide lighting fixtures, according to embodiments of the claimed invention.

FIG. 11 illustrates light distribution patterns for the square and round waveguides discussed in FIGS. 8-10. A square waveguide fixture can project a light distribution pattern similar to that of pattern 1105 (e.g., a square frustum pattern, a square batwing pattern, etc.). Conversely, a square waveguide fixture can project a light distribution pattern similar to that of pattern 1110 (e.g., a conical frustum pattern, a batwing pattern, etc.).

Figure 12:
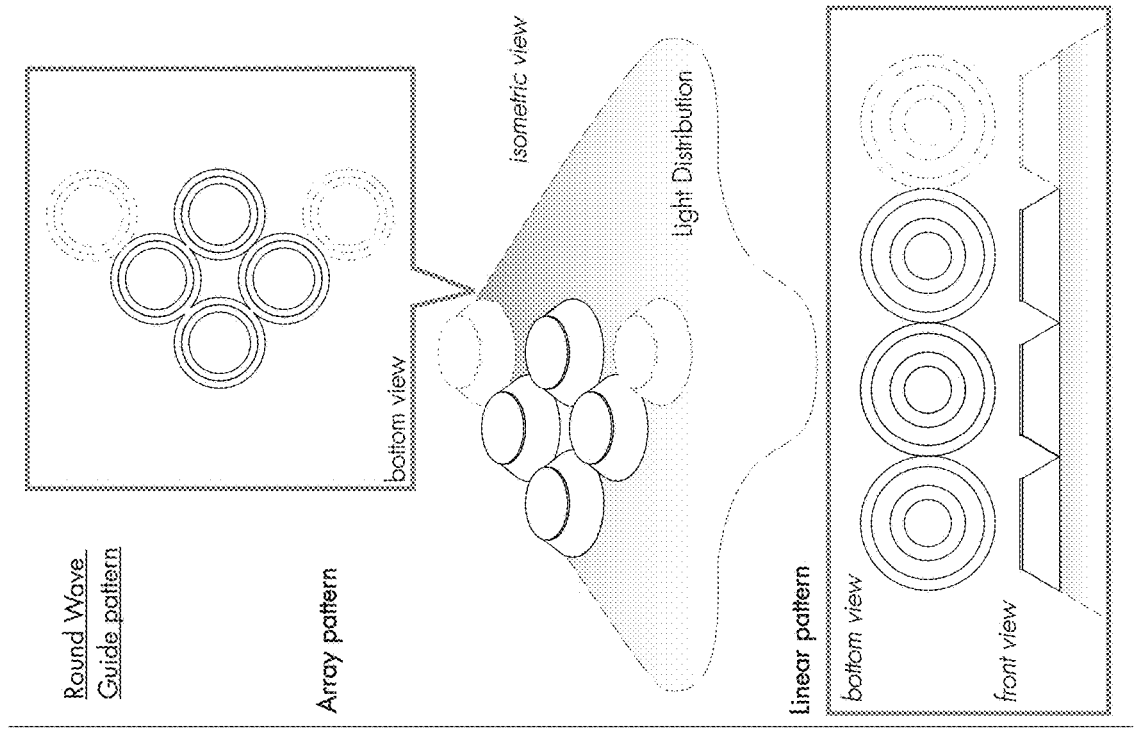
FIG. 12 depicts array configurations for waveguide lighting fixtures, according to embodiments of the claimed invention.
Figure 12:
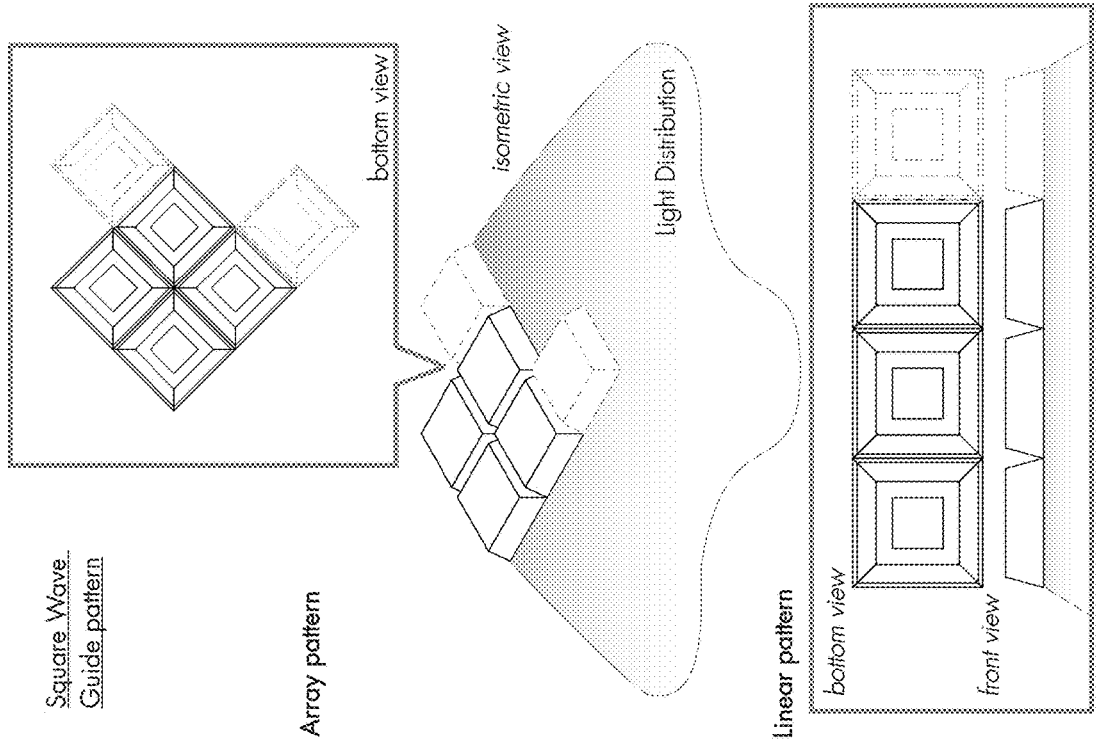

FIG. 12 illustrates arrays of the square and round light fixtures. Similar to the connected light fixtures of FIG. 3, the square and round fixtures can be arrayed with other fixtures. These arrays can aggregate the light projections from the individual fixtures, such that the projected light increases in size and scope proportionately to the number of light fixtures in the array.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A light fixture, comprising:
an LED light source for emitting light rays;
a waveguide optically coupled to the LED light source to receive and guide the emitted light rays from a proximal end of the waveguide to a distal end of the waveguide;
at least a first extrusion, the waveguide being positioned such that the proximal end is located within a cavity of the first extrusion, the waveguide partially protruding from the first extrusion;
wherein the first extrusion includes a first reflective surface located overhead of the waveguide and a second reflective surface located underhead of the waveguide;
the first reflective surface configured to receive a first portion of the emitted light rays and reflect the first portion at a first distribution to produce a first ambient light distribution; and
the second reflective surface configured to receive a second portion of the emitted light rays and reflect the second portion at a second distribution to produce a second ambient light distribution.

2. The light fixture of claim 1, further comprising:
a microlens located on or in at least one surface of the distal end of the waveguide and configured to receive the emitted light rays and transmit the emitted light rays.

3. The light fixture of claim 1, further comprising:
a prismatic or lenticular surface located on or in at least one surface of the distal end of the waveguide and configured to receive the emitted light rays and transmit the emitted light rays.

4. The light fixture of claim 1, wherein the first distribution comprises an approximately 20 degree angle from a direction of emission for the emitted light rays.

5. The light fixture of claim 1, wherein the emitted light rays form a square batwing profile.

6. The light fixture of claim 1, wherein the waveguide comprises a translucent material.

7. The light fixture of claim 6, wherein the guided light rays are imperceptible within the waveguide and perceptible upon reaching the distal end of the waveguide.

8. A light fixture, comprising:
two sets of LED light sources adapted or configured to produce light;
a plurality of waveguides coupled to each set of LED light sources, at least one of the plurality of waveguides being oriented at an oblique angle relative to another of the plurality of waveguides, wherein each of the plurality of waveguides is adapted or configured to:
receive, at an edge of the waveguide, the produced light; and
guide the light through the waveguide; and
a reflective structure adapted or configured to redirect a portion of the guided light to produce a light distribution.

9. The light fixture of claim 8, wherein the plurality of waveguides comprises a first waveguide and a second waveguide; wherein the first waveguide and the second waveguide are positioned so as to define a gap between them.

10. The light fixture of claim 9, wherein the first waveguide and the second waveguide are configured such that they are opposite to each other.

11. The light fixture of claim 8, wherein the plurality of waveguides guides light to an interior of the fixture.

12. The light fixture of claim 8, wherein the plurality of waveguides is further adapted or configured to define a hole, slot or cavity.

13. A light fixture, comprising:
a first waveguide and a second waveguide;
a support structure, where the first waveguide and the second waveguide are mounted to the support structure and on a same plane;
at least one LED light attached to an exterior of the first waveguide, light from the at least one LED being guided through the first waveguide and projected from the first waveguide towards the second waveguide.

\* \* \* \* \*